United States Patent
Rice

(10) Patent No.: US 10,206,381 B2
(45) Date of Patent: Feb. 19, 2019

(54) FISHING LURE

(71) Applicant: Sean M. Rice, Chicago, IL (US)

(72) Inventor: Sean M. Rice, Chicago, IL (US)

(73) Assignee: SLIPRIG, LLC, Chicago, IL (US)

( * ) Notice: Subject to any disclaimer, the term of this patent is extended or adjusted under 35 U.S.C. 154(b) by 1212 days.

(21) Appl. No.: 13/904,560

(22) Filed: May 29, 2013

(65) Prior Publication Data

US 2013/0318856 A1    Dec. 5, 2013

Related U.S. Application Data

(60) Provisional application No. 61/652,844, filed on May 29, 2012.

(51) Int. Cl.
*A01K 85/00* (2006.01)

(52) U.S. Cl.
CPC .................................. *A01K 85/00* (2013.01)

(58) Field of Classification Search
CPC ...................................................... A01K 85/00
USPC ............... 43/42.02, 42.36, 42.24, 34, 35, 37
See application file for complete search history.

(56) References Cited

U.S. PATENT DOCUMENTS

| | | | | | |
|---|---|---|---|---|---|
| 1,390,458 A | * | 9/1921 | Moree | ..................... | A01K 85/16 43/42.05 |
| 1,777,004 A | * | 9/1930 | Lemere | ................... | A01K 85/16 43/42.36 |
| 1,792,366 A | * | 2/1931 | Ettles | ..................... | A01K 85/18 43/42.26 |
| 2,183,059 A | * | 12/1939 | Bacon | ..................... | A01K 85/14 43/42.03 |
| 2,290,433 A | * | 7/1942 | Jeffers | ..................... | A01K 85/16 43/42.02 |
| 2,618,097 A | * | 11/1952 | Johnstone | .............. | A01K 83/02 43/44.8 |
| 2,663,964 A | * | 12/1953 | Martin | ................... | A01K 85/18 43/42.02 |
| 2,690,026 A | * | 9/1954 | King | ....................... | A01K 85/00 43/42.02 |
| 2,763,085 A | * | 9/1956 | Caillier | .................. | A01K 85/16 43/42.02 |
| 2,770,063 A | * | 11/1956 | Martin | ................... | A01K 85/16 43/42.02 |
| 2,791,859 A | * | 5/1957 | Wentworth | ............ | A01K 85/16 43/42.02 |
| 2,797,517 A | * | 7/1957 | Eriksen | .................. | A01K 85/01 43/42.05 |
| 2,892,281 A | * | 6/1959 | Schilling | ................ | A01K 85/16 43/42.36 |

(Continued)

FOREIGN PATENT DOCUMENTS

| | | | | |
|---|---|---|---|---|
| CA | 2770972 A1 | * | 9/2013 | ............. A01K 85/00 |
| FR | 2722650 A1 | * | 1/1996 | ............. A01K 85/00 |

(Continued)

*Primary Examiner* — Darren W Ark
(74) *Attorney, Agent, or Firm* — Richards Patent Law P.C.

(57) ABSTRACT

The present invention relates to a fishing lure including a body having a head portion and tail portion, wherein the tail portion includes an opening to receive a fishing line. The lure also includes a hook that is connected to the head portion, wherein tension applied to a fishing line thread through the opening and tied to the hook causes the body to bend and release of the tension applied to the fishing line causes the body to straighten.

10 Claims, 3 Drawing Sheets

(56) References Cited

U.S. PATENT DOCUMENTS

| | | | | |
|---|---|---|---|---|
| 2,910,799 A * | 11/1959 | Wentworth | ............ | A01K 85/16 43/42.02 |
| 2,912,784 A * | 11/1959 | Carlin | .................... | A01K 85/00 43/42.24 |
| 3,120,074 A * | 2/1964 | Messler | ................. | A01K 85/00 43/42.36 |
| 3,205,608 A * | 9/1965 | Dickinson | .............. | A01K 85/16 43/42.05 |
| 3,230,658 A * | 1/1966 | Wuotila | ................. | A01K 85/14 43/42.23 |
| 3,376,663 A * | 4/1968 | Amrine | .................. | A01K 85/16 43/42.02 |
| 3,388,495 A * | 6/1968 | Minser | ................... | A01K 85/16 43/42.05 |
| 3,497,985 A * | 3/1970 | Joel | ........................ | A01K 85/02 43/35 |
| 3,543,430 A * | 12/1970 | Brokaw | ................. | A01K 85/00 43/42.02 |
| 3,688,433 A * | 9/1972 | Niskin | ................... | A01K 69/00 43/100 |
| 3,831,307 A * | 8/1974 | Pittman | ................. | A01K 85/01 43/42.24 |
| 3,967,406 A * | 7/1976 | Anderson | .............. | A01K 85/16 43/42.24 |
| 4,064,646 A * | 12/1977 | Vercellone | ............. | A01K 85/16 43/42.41 |
| 4,134,224 A * | 1/1979 | Clark | .................... | A01K 85/16 43/42.36 |
| 4,164,826 A * | 8/1979 | Metzler | ................. | A01K 85/16 43/42.05 |
| 4,208,822 A * | 6/1980 | Bryant | ................... | A01K 85/01 43/42.02 |
| 4,884,360 A * | 12/1989 | Pearcy | .................. | A01K 97/06 43/54.1 |
| 5,142,811 A * | 9/1992 | Freeman | ................ | A01K 85/00 43/42.36 |
| 5,197,217 A * | 3/1993 | Browning | ............. | A01K 91/04 43/4 |
| 5,490,345 A * | 2/1996 | Infinger | ................ | A01K 95/00 43/42.36 |
| 5,829,183 A * | 11/1998 | Guerin | .................. | A01K 85/18 43/42.02 |
| 6,505,432 B2 * | 1/2003 | Brinkman | ............. | A01K 83/06 43/42.02 |
| 6,546,663 B1 * | 4/2003 | Signitzer | ................ | A01K 85/00 43/42.02 |
| 6,651,375 B2 * | 11/2003 | Parrish | ................... | A01K 85/02 43/35 |
| 6,772,552 B2 * | 8/2004 | Parrish | ................... | A01K 85/02 43/35 |
| 6,865,842 B2 * | 3/2005 | Brinkman | .............. | A01K 85/00 43/42.02 |
| 7,254,916 B2 * | 8/2007 | Mussot | ................. | A01K 85/02 43/35 |
| 7,254,917 B2 * | 8/2007 | Brickett | ............... | A01K 91/06 43/42.02 |
| 7,415,793 B1 * | 8/2008 | Borchardt | ........... | A01K 91/065 43/42.24 |
| 7,954,274 B2 * | 6/2011 | MacDonald | ........... | A01K 85/00 43/42.02 |
| 8,020,338 B2 * | 9/2011 | Brown | ................... | A01K 85/00 43/42.02 |
| 8,793,924 B2 * | 8/2014 | Hughes | ................. | A01K 85/18 43/42.02 |
| 8,925,241 B1 * | 1/2015 | Smith | .................... | A01K 85/02 43/37 |
| 9,253,966 B2 * | 2/2016 | Scholfield | ............. | A01K 85/01 |
| 9,439,407 B2 * | 9/2016 | Signitzer | ................ | A01K 85/01 |
| 9,936,681 B2 * | 4/2018 | Mancini | ................ | A01K 85/18 |
| 2001/0047609 A1 * | 12/2001 | Orgeron | ................ | A01K 85/00 43/42.31 |
| 2002/0073599 A1 * | 6/2002 | Brinkman | ............. | A01K 83/06 43/4.5 |
| 2005/0172538 A1 * | 8/2005 | Brinkman | ............. | A01K 85/00 43/42.36 |
| 2005/0217166 A1 * | 10/2005 | MacDonald | ........... | A01K 85/00 43/42.36 |
| 2006/0053679 A1 * | 3/2006 | Milanese | ............... | A01K 85/16 43/42.36 |
| 2010/0050497 A1 * | 3/2010 | Brown | ................... | A01K 85/01 43/42.24 |
| 2010/0154285 A1 * | 6/2010 | Greenfield | ............ | A01K 85/00 43/42.24 |
| 2014/0259867 A1 * | 9/2014 | Scholfield | ............ | A01K 85/01 43/42.06 |

FOREIGN PATENT DOCUMENTS

| | | | | |
|---|---|---|---|---|
| FR | 2762756 A1 * | 11/1998 | ............ | A01K 85/00 |
| JP | 10113099 A * | 5/1998 | | |
| JP | 2009072109 A * | 4/2009 | | |

* cited by examiner

FISHING LURE

CROSS-REFERENCE TO RELATED APPLICATIONS

This application incorporates by reference and claims priority to U.S. Provisional Application No. 61/652,844 filed on May 29, 2012.

BACKGROUND OF THE INVENTION

The present subject matter relates generally to a fishing lure. More specifically, the present invention relates to a flexible fishing lure that mimics lifelike activity when the fishing line is pulled. Unlike traditional fishing lures, the fishing line passes through the fishing lure in an opening towards the tail of the lure and then attaches to the head of the lure. A tug of the fishing line folds the lure in half, creating more realistic movement within the lure to attract a fish.

Fishing lures are often attached to the end of a fishing line, along with a fishing hook, to attract fish to bite the fishing hook. A fishing lure may be designed to resemble a fish, thus luring in prey. Many fishing lures may be colorful, shiny, and include the features of a real fish, such as eyes, fins, scales, and a tail. Fishing lures also use movement to attract a fish's attention, so the fish may approach the lure and eventually bite or make contact with the fishing hook.

Usually the fishing line is attached to the fishing lure at one end, limiting the influence of the fishing line on the movement of the lure. Fishing lures are normally cast out and reeled in, in a liner fashion; the movement of the lure intending to attract a fish. Once the fishing lure is cast out, a fisherman may pull on the fishing line, and/or reel the line in, and the fishing line pulls the lure towards the fisherman. This creates movement of the lure through the water, similar to a swimming fish. However, since the fisherman must pull the line to create movement in the lure, the lure keeps getting closer and closer to the fisherman, and eventually the fisherman will have reeled the lure in completely and must cast it out again.

Continuously pulling in and casting out the fishing line can be tedious, and reduces the likelihood of catching a fish, since the lure is ineffective when taken out of the water. Also, a fisherman may have a target location in which the fisherman is trying to attract a fish, such as by a rock or some seaweed where a fish may be hiding. If a fisherman must constantly reel in and cast a lure to the target location, the repetitive casting may scare off a fish or deter a fish from biting the lure.

Moreover, while the movement of traditional lures through the water may somewhat resemble realistic movement, the lure itself does not move and does not mimic live bait. Because the fishing line interacts with the lure at a single point of connection, the movement of the fishing line merely pulls the body of the lure through the water. Accordingly, the lure itself does not exhibit lifelike movement.

Accordingly, a need exists for a fishing lure that mimics the realistic movement of live bait and does not require continuous reeling in as described and claimed herein.

BRIEF SUMMARY OF THE INVENTION

The present disclosure provides a fishing lure adapted to mimic the realistic movement of live bait. The fishing lure includes a body including a head portion, a central portion, and a tail portion. The tip of the head portion of the body mates with a fishing hook. There is an opening in the body of the lure located between the central portion and the tail portion of the fish, through which a fishing line may pass. The opening is reinforced by a grommet, designed especially for the fishing lure, which may protect the fishing line from fraying or breaking as it passes through the grommet. Pulling of the fishing line pulls the hook towards the grommet, folding or compressing an elastomeric portion of the lure between the hook and grommet as the fishing line pulls through the grommet. Release of the tension on the fishing line enables the fishing line to pass back through the grommet and return the fishing lure to its initial shape. This movement mimics the movement of live bait and propels the fishing lure through the water as described further herein.

The body of lure may be designed to look like a fish, and may be decorated with the features of a fish. Accordingly, the head portion may include features such as eyes, a mouth, and gills. The central portion of the body may include scales in a variety of bright and attractive colors. The tail portion may be shaped as that of a tail of a fish and may be substantially wider than the head portion and central portion of the body, thus resembling an actual rear fin of a fish. The tail portion of the lure may also be concaved or cupped on one side of the lure to act as a paddle to assist in propelling the lure through the water, much as a fish would naturally, as described further herein. The main purpose of the appearance of the body is that it may mimic a real fish as closely as possible. While it is presently preferred for the fishing lure to resemble a fish, it is contemplated that the fishing lure may otherwise be adapted to resemble any other live bait, such as, worms, leeches, minnows, crayfish, crickets, grasshoppers, sea worms, eels, crabs, shrimp, squid, etc. Accordingly, while the primary examples used throughout the disclosure relate to an embodiment in which the fishing lure resembles a fish, it is understood that the teachings provided herein may be applied to a fishing lure that resembles any type of live bait.

The body of the fishing lure (or portions of the body of the fishing lure) may be composed of a rubber or similar elastic polymeric material that enables the fishing lure to be compressible and/or flexible, to store mechanical energy when compressed or flexed (i.e., act like a spring), and be resilient enough to withstand being in the water for long amounts of time and to withstand the bite of a fish. While flexible, the preferred material retains a "memory" of its shape, which enables the lure to return to its normal, straightened (unloaded) shape when not experiencing a compressive force. Accordingly, when there is no force pulling the fishing line, the lure maintains its initial shape. When the fisherman pulls the line, the lure compresses and/or folds. Thus, when the fisherman tugs or jerks the line to fold the lure, the lure's "memory" causes the lure to quickly straighten back to its original shape and the release of the stored mechanical energy from the movement of the fishing lure from the compressed state to the uncompressed state causes the lure to propel itself through the water.

As described above, the opening includes a grommet that allows the line to freely pass back and forth through the opening without fraying or breaking. In the primary example, the grommet includes a female and male portion that are joined together in the opening near the tail portion of the lure. However, it is contemplated that any grommet or similar element may be employed to help minimize friction and prevent wear on the fishing line as it is regularly pulled through the body of the fishing lure as described herein.

At the opposite end of the fishing lure, the head portion includes, or mates with, a fishing hook. The fishing hook is adapted to resist being pulled from the fishing lure when the user pulls on the fishing line. For example, in one contemplated embodiment, the fishing hook includes a horizontal pin or crossbar perpendicular to the hook's shank, which helps to prevent the fishing hook from being pulled out of or through the tip of the head portion of the lure.

The fishing lure improves the efficiency with which fisherman may catch fish. When using the fishing lure, a fisherman may pull on the fishing line, thus pulling the head portion of the lure back towards the tail portion of the lure, essentially folding or compressing the lure. A small tug of the fishing line is all that is needed to fold or compress the lure momentarily. Then, immediately after the compressive force is released, the lure springs back to its initial state, thereby propelling itself in a random direction, mimicking the movement of live bait. For example, in the preferred embodiment, the movement of the fishing lure may twitch and shake in place, resembling the movement of a dying fish, even while generally not moving much from its original location in the water. Contrast that with a traditional lure, which must be constantly pulled closer and closer to the fisherman to create any sense of movement. Using this fishing lure described herein, a fisherman may manipulate the fishing lure to twitch and move about only when the fisherman desires and may otherwise be left in a desired location. Eliminating the need to constantly reel in and cast out the lure maximizes the lure's time in the water and increases the likelihood attracting a fish to bite the fishing lure.

The present disclosure provides for a fishing lure comprising a body comprising a head portion and a tail portion, and a hook connected to the head portion, wherein the tail portion includes an opening to receive a fishing line. Tension applied to a fishing line threaded through the opening and tied to the hook causes the body to bend, and release of the tension applied to the fishing line causes the body to straighten. The body may be shaped like a fish. In an example, the body further includes a flexible central portion connecting the head portion to the tail portion. In one example, the body may include a memory-retaining element that enables the body to return to an original shape after bending the body.

The hook may be removeably connected to the head portion. In addition, the hook may comprise a retaining member configured to prevent the hook from detaching from the body of the lure. In an example, the hook comprises a shank including a crossbar perpendicular to the longitudinal axis of the shank, wherein the crossbar secures the hook to the body.

The tail portion may include a grommet configured to receive a fishing line. The grommet may include a female portion and male portion, wherein, upon the female portion engaging with the male portion, the grommet is secured to the tail portion. In an example, the female portion engages with the male portion to form an opening including a curved interior surface to receive a fishing line. The tail portion may include a concave shape configured to propel the lure through water.

The disclosure also provides a fishing lure including a fish-shaped body comprising a head portion, a flexible central portion, and a tail portion. The lure also includes a hook connected to the head portion. A first opening extends from one side of the body to another side of the body to receive a fishing line. The first opening is positioned near an intersection of the central portion and tail portion. The body may also comprise a second opening in the head portion to receive the hook. The hook may include a shank including a crossbar perpendicular to the longitudinal axis of the shank, wherein the crossbar secures the hook to the head portion.

The fishing lure may also include a grommet engaged with the first opening in the tail portion. The grommet may include a female portion and male portion, wherein, upon the female portion engaging with the male portion, a circumferential channel through the first opening is formed, wherein an interior surface of the channel is curved. An outer surface of the grommet may include at least one securing teeth to secure the grommet to the surface of the body.

An advantage of the fishing lure is that it may be manipulated to mimic the movements of live bait.

Another advantage of the fishing lure is that a user may create movement within the lure itself simply with a slight pull on the fishing line.

Another advantage of the fishing lure is that it may return to its initial uncompressed form when there is no force pulling the fishing line.

A further advantage of the fishing lure is that the release of the energy stored by the compression of the elastic portions of the lure may propel the fishing lure in random directions to closely resemble live bait.

Yet another advantage of the fishing lure is that it may be positioned in a desired general location even while being manipulated by the user to create movement in the fishing lure.

Another advantage of the fishing lure is that it may be designed to appear natural in shape, colors, and movement, and does not need to be constantly manipulated to resemble a real fish.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
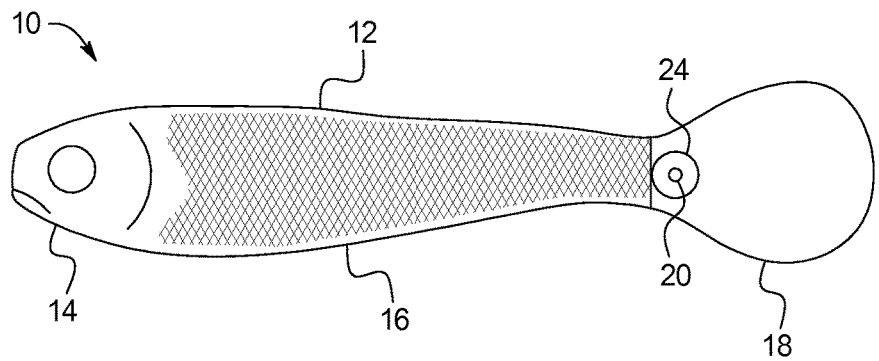
FIG. 1A is a side view of an example of the fishing lure.
Figure 1B:
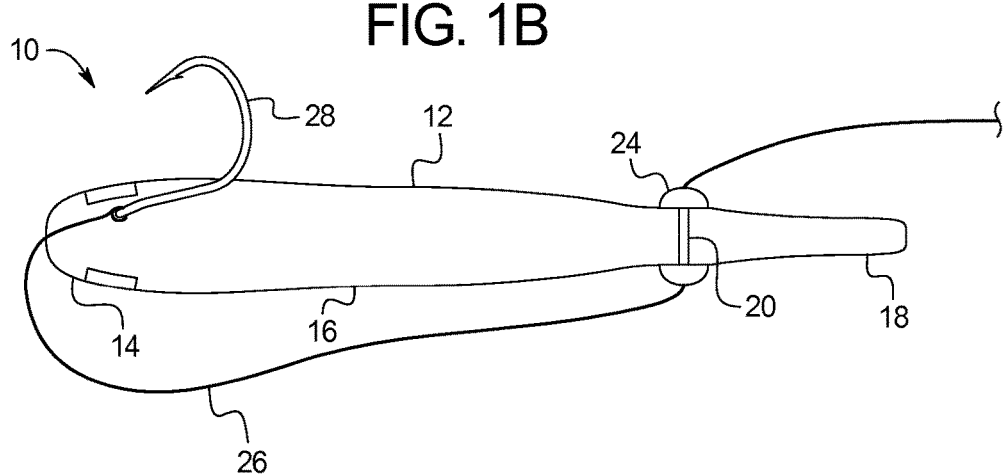
FIG. 1B is a top view of the example of the fishing lure shown in FIG. 1A in an initial state.
Figure 1C:
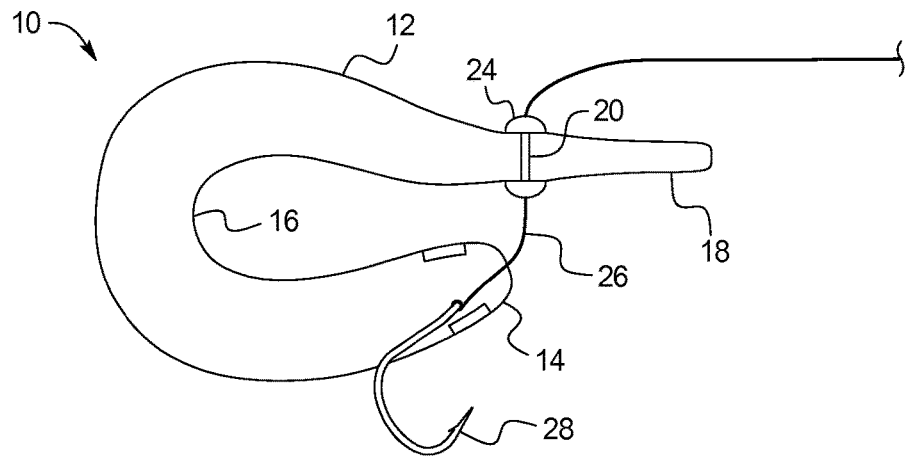
FIG. 1C is a top view of the example of the fishing lure shown in FIG. 1A in a compressed state.

FIGS. 1A-1C illustrate an example of a fishing lure 10 according to the teachings provided herein. As shown in FIGS. 1A-1C, the fishing lure 10 includes a body 12 including a head portion 14, a central portion 16, and a tail portion 18. The body 12 further includes a hook 28 located adjacent to or within the head portion 14 and a grommet 24 defining an opening 20 adjacent to or within the tail portion 18.

In the example shown in FIG. 1A, the body 12 of lure 10 is designed to look like a fish. Accordingly, the body 12 may be decorated with the features of a fish. As shown in the example in FIG. 1A, the head portion 14 includes features such as eyes, a mouth, and gills. The central portion 16 of the body 12 includes scales that may be provided in a variety of bright and attractive colors. The tail portion 18 may be shaped as that of a tail of a fish. As shown in FIG. 1A, the tail portion 18 may be substantially wider than the head portion 14 and central portion 16 of the body 12, thus resembling an actual rear fin of a fish. In the example shown in FIG. 1A, the tail portion 18 of the lure 10 is concave, or cupped, on one side of the lure 10 to act as a paddle to assist in propelling the lure 10 through the water, as described further herein. The main purpose of the appearance of the body 12 is to mimic a real fish as closely as possible. It is contemplated that the body 12 of the lure 10 may be include any other features of a fish, or none at all, as long as it may be attractive and inviting to a fish. It is further recognized that the lure 10 may be otherwise adapted to resemble any form of live bait.

FIG. 1B is a top view the lure 10 when the body 12 in its uncompressed form. As shown, a fishing line 26 may pass freely through the grommet 24 in the opening 20 in the lure 10. The line 26 passes through the opening 20 and extends to the head portion 14 of the body 12 where the line 26 is tied, or otherwise secured, to the hook 28.

The body 12 of the lure 10, particularly the portion between the opening 20 and the hook 28, may be formed from an elastomeric material that is responsive to tension pulled through the line 26. As a result, when a user pulls/tugs/yanks on the line 26 the body 12 of the lure 10 folds, or compresses, as shown in FIG. 1C. Then, when the tension in the line 26 is released, the mechanical energy stored in the body 12 is released, and the body 12 springs back to the shape shown in FIG. 1B. In springing from the compressed form (FIG. 1C) back to the uncompressed form (FIG. 1B), the lure 10 propels itself through the water. Accordingly, based on design of the lure 10, particularly tail portion 18 of the lure 10, the movement of the lure 10 may be tailored. For example, as described above, the tail portion 18 may be shaped as a functional fin or paddle.

In a contemplated alternative embodiment of the lure 10, the body 12 includes a separate flexible memory-retaining, elastic element. This separate memory-retaining element may be especially important when the size of the lure 10, or the material used, requires assistance to return to the uncompressed form. One example of a memory-retaining element is a nickel titanium wire embedded in the body 12 of the lure 10.

In the example shown, it is important for the fishing hook 28 to remain affixed to the head portion 14 of the lure 10. Of course, it is understood that there may be embodiments of the lure 10 in which the fishing hook 28 is attached to, or adjacent to, the tail portion 18. Further, there may be still other versions of the lure 10 in which the design of the body 12 is significantly altered (e.g., to mimic another type of live bait). In such cases, the relative position of the fishing hook 28 and the opening 20 should be configured such that the application and release of tension in the fishing line 26 may cause the lure 10 to compress and release as described above.

Figure 2A:
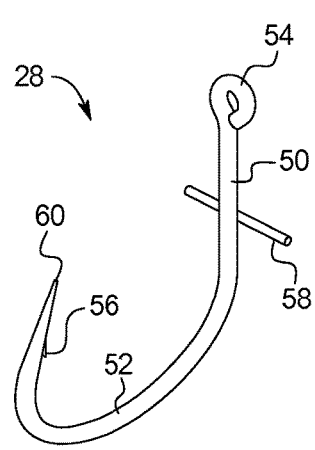
FIG. 2A is a perspective view of a fishing hook.
Figure 2C:
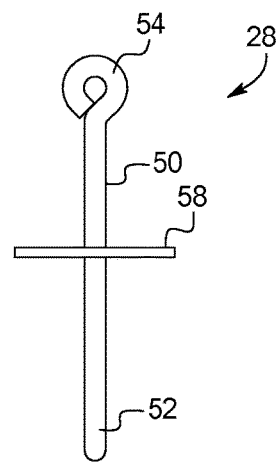
FIG. 2C is a front view of the fishing hook shown in FIG. 2A.
Figure 2B:
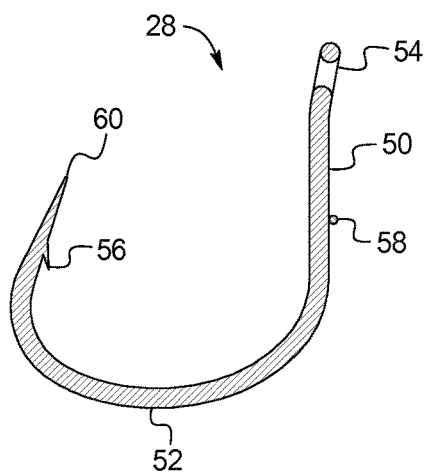
FIG. 2B is a side view of the fishing hook shown in FIG. 2A.
Figure 2D:
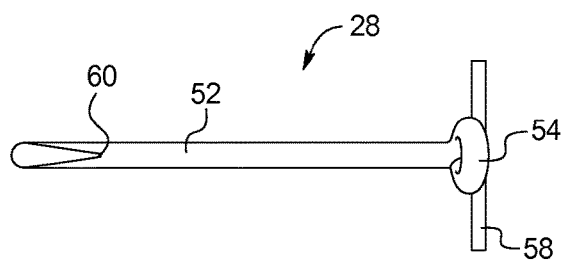
FIG. 2D is a top view of the fishing hook shown in FIG. 2A.

FIGS. 2A-2D illustrate one example of a fishing hook 28 that may be used with the lure 10. As shown in FIG. 2A, like most fishing hooks, the fishing hook 28 includes a shank 50, a bend 52, an eye 54, a barb 56, and a point 60. In addition, the fishing hook 28 shown includes a crossbar 58 attached to the shank 50.

The crossbar 58 functions to secure the hook 28 to the head portion 14 and prevent the fishing hook 28 from detaching from the lure 10. For example, as shown in FIG. 1B, the fishing hook 28 may be thread through an opening in the head portion 14 of the lure 10 such that the crossbar 58 prevents the eye 54 from passing all the way through the head portion 14.

In one embodiment, the head portion contains a gill opening and a mouth opening. When the hook 28 is fed through the gill opening and partially out the mouth opening, the crossbar 58 is positioned such that the barb 56 and point 60 are exposed near the surface of the head portion 14. For example, the gill opening may be wide enough to allow the crossbar 58 to pass through, however, the mouth opening may be too narrow for the crossbar 58 to pass through. As such, the crossbar 58 prevents the eye 54 of the hook 28 from passing through the mouth opening.

It is contemplated that the crossbar 58 is just one example of a retaining member that may secure a portion of the hook 28 to or within the lure 10. For example, the retaining member may be a spherical element. Of course, there are numerous alternative designs for the retaining member, as will be recognized by those skilled in the art based on the disclosure provided herein.

As shown in FIGS. 1A-1C, the opening 20 is fitted with a grommet 24 to allow the line 26 to freely pass back and forth through the opening 20 without fraying or breaking. Greater details of the grommet 24 are shown in FIGS. 3A-3D.

Figure 3A:
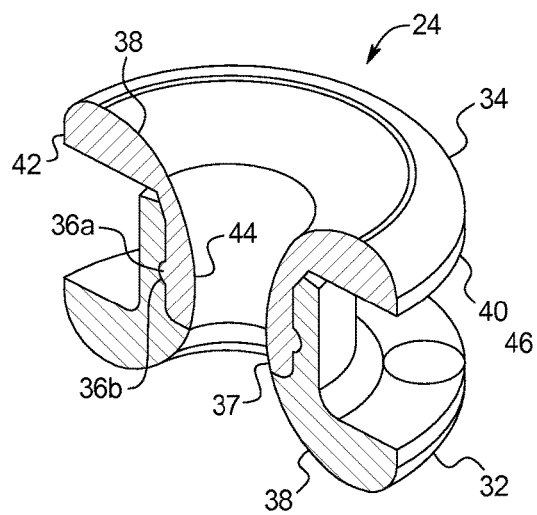
FIG. 3A is a perspective view of a cross-section of a grommet.

In the example shown in FIGS. 3A-3D, the grommet 24 includes a female portion 32 and male portion 34. As shown in FIG. 3A, the example of the grommet 24 provided includes a separate female portion 32 and male portion 34 that fit together in a snap-fit connection to provide the opening 20 for the fishing line 26 to pass through the lure 10. The female portion 32 and the male portion 34 snap together at corresponding coupling sections 36a and 36b, creating a smooth, interior curved wall 38 that guides the fishing line 26 through the opening 20. The curved wall 38 provides a surface free from protrusions that could snag the fishing line 26 causing it to weaken or break. Accordingly, the fishing line 26 may pass through the grommet 24 without putting any stress of the fishing line 26 or the lure 10.

As shown in the example in FIG. 3A, the outer edge 40 of the grommet 24 has a larger outer diameter 42 than the inner diameter 44, allowing the grommet 24 to fit over the opening 20 of the lure 10 while preventing the grommet 24 from passing through the opening 20 in the lure 10 itself. Once the male portion 34 is fit into the female portion 32 at the coupling section 36, the grommet 24 is securely fastened to the lure 10, and cannot be removed unless the female portion 32 and male portion 34 are disengaged.

Figure 3C:
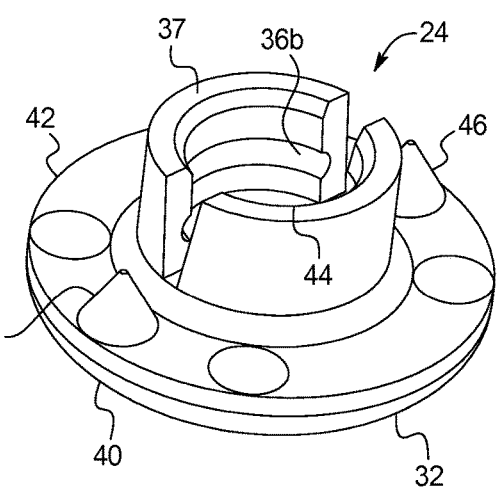
FIG. 3C is of a perspective view of a male portion of the grommet shown in FIG. 3B.

The example shown in FIG. 3C illustrates the female portion 32 of the grommet 24, where the coupling section 36a is a circumferential protrusion located along the outer surface of an inner shaft 37. In the example shown in FIG. 3B, the male portion 34 of the grommet 24 includes a corresponding coupling section 36b shown as a circumferential channel located along the inner surface of inner shaft 37. The corresponding coupling sections 36a and 36b snap together to securely lock the female portion 32 and the male portion 34 together.

Figure 3B:
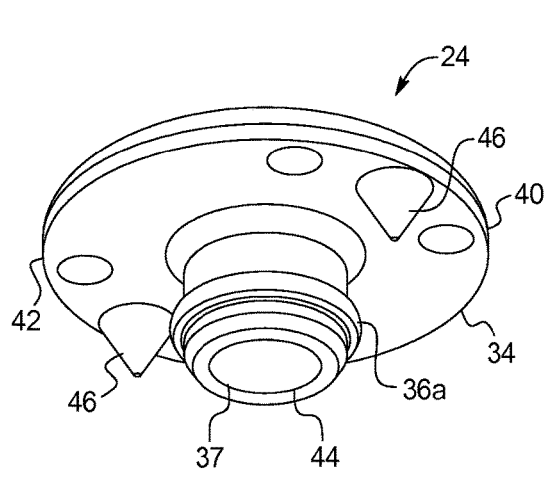
FIG. 3B is a perspective view of a female portion of the grommet shown in FIG. 3A.

As further shown in FIGS. 3B and 3C, both the female portion 32 and the male portion 34 include securing means 46 to assist securing the grommet 24 in place on the lure 10. In the example shown in FIG. 3B and FIG. 3C, the securing means 46 are generally cone-shaped, pointed teeth. However, it is contemplated that the securing means 46 may be formed in any manner that assists in securing the grommet 24 to the lure 10.

Figure 3D:
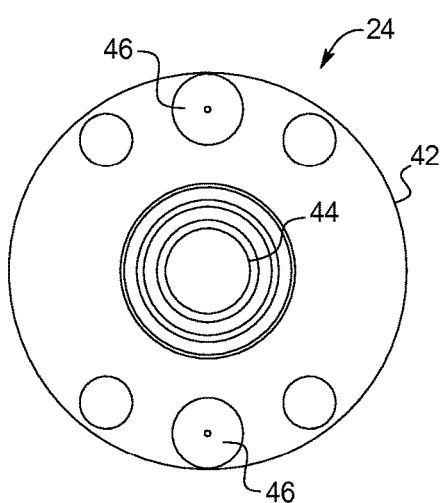
FIG. 3D is a top view of the grommet shown in FIG. 2A.

Turning now to FIG. 3D shows the assembled version of the grommet 24 and particularly the opening 20 through which the fishing line 26 may pass. In the example shown in FIGS. 3A-3D, the grommet 24 is formed from stainless steel for strength and to resist corrosion. However, it is contemplated that in other embodiments, the grommet 24 may be composed of any other appropriate material.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A fishing lure comprising:
    a body, comprising a first distal end portion and a second proximal end portion, wherein the body is moveable between an uncompressed state and a compressed state; wherein in the uncompressed state, the body defines a first side extending from the first distal end portion to the second proximal end portion and a second side opposing the first side, the second side also extending from the first distal end portion to the second proximal end portion;
    a hook comprising a shank, a retaining member secured to the shank, and a point, wherein the retaining member of the hook is positioned within the first distal end portion of the body and secures the hook to the body preventing the hook from moving relative to the body and the point of the hook is positioned outside of the body, wherein the retaining member extends across a longitudinal axis of the shank;
    a fishing line extending through an opening in the second proximal end portion such that, in the uncompressed state, the fishing line passes from the first side of the body through the opening to the second side of the body, extends along the second side of the body from the opening in the second proximal end portion, and connects to the hook at the first distal end portion;
    wherein the hook is positioned on the first side of the body;
    wherein, when in the uncompressed state, in response to tension applied to the fishing line proximal to the opening along the first side of the body, the body moves from the uncompressed state to the compressed state;
    wherein, in the uncompressed state, the point of the hook points away from the second proximal end portion in a fixed direction due to the retaining member; and
    wherein, in the compressed state, the first end portion is bent towards the second proximal end portion and the point of the hook faces toward the second proximal end portion of the body in a fixed direction due to the retaining member.

2. The lure of claim 1, wherein the hook is removably connected to the first distal end portion.

3. The lure of claim 1, wherein the retaining member which extends across the longitudinal axis of the shank comprises a crossbar perpendicular to the longitudinal axis of the shank and configured to prevent the hook from detaching from the first distal end portion.

4. The lure of claim 1, wherein the opening includes a grommet configured to receive the fishing line.

5. The lure of claim 4, wherein the grommet includes a female portion and a male portion, wherein, upon the female portion engaging with the male portion, the grommet is secured to the opening.

6. The lure of claim 4, wherein the grommet includes a female portion and a male portion, wherein, upon the female portion engaging with the male portion, a curved interior surface is formed to receive a fishing line.

7. The fishing lure of claim 4, wherein an outer surface of the grommet includes at least one securing tooth to secure the grommet to a surface of the body.

8. The lure of claim 4, wherein the body is shaped like a fish.

9. The lure of claim 4, wherein the second end portion comprises a concave tail shape configured to propel the lure through water when the body moves between the compressed state and the uncompressed state.

10. The lure of claim 4, wherein the retaining member is a crossbar integrally formed with the shank of the hook.

* * * * *